(12) United States Patent
Yamashita et al.

(10) Patent No.: US 6,779,018 B1
(45) Date of Patent: Aug. 17, 2004

(54) COUNTED TIME PERIOD CERTIFYING SYSTEM

(75) Inventors: Hiroki Yamashita, Chiba (JP); Hisatoshi Taura, Fukuoka (JP)

(73) Assignee: Justsystem Corporation, Tokushima (JP)

( * ) Notice: Subject to any disclaimer, the term of this patent is extended or adjusted under 35 U.S.C. 154(b) by 568 days.

(21) Appl. No.: 09/668,147

(22) Filed: Sep. 25, 2000

(30) Foreign Application Priority Data

Sep. 28, 1999 (JP) .......................................... 11-273929

(51) Int. Cl.$^7$ ............................................. G06F 15/16
(52) U.S. Cl. ...................... 709/203; 709/202; 709/217; 709/218; 709/219; 709/224
(58) Field of Search ................................ 709/203, 217, 709/218, 219, 224, 202

(56) References Cited

U.S. PATENT DOCUMENTS

| | | | | |
|---|---|---|---|---|
| 5,862,328 A | * | 1/1999 | Colyer ........................ | 709/203 |
| 5,889,955 A | * | 3/1999 | Shinozaki et al. ........... | 709/224 |
| 6,006,260 A | * | 12/1999 | Barrick et al. ............... | 709/224 |
| 6,122,664 A | * | 9/2000 | Boukobza et al. ........... | 709/224 |
| 6,178,449 B1 | * | 1/2001 | Forman et al. .............. | 709/224 |
| 6,321,264 B1 | * | 11/2001 | Fletcher et al. ............. | 709/224 |
| 6,397,359 B1 | * | 5/2002 | Chandra et al. ............. | 714/712 |
| 6,446,132 B1 | * | 9/2002 | Kikuchi ....................... | 709/239 |
| 6,470,449 B1 | * | 10/2002 | Blandford ................... | 713/178 |
| 2002/0026321 A1 | * | 2/2002 | Faris et al. .................... | 705/1 |

FOREIGN PATENT DOCUMENTS

| | | |
|---|---|---|
| JP | H5-224941 | 9/1993 |
| JP | H5-344084 | 12/1993 |
| JP | H8-251177 | 9/1996 |
| JP | 11-120467 | 4/1999 |

* cited by examiner

Primary Examiner—Glenton B. Burgess
Assistant Examiner—Yasin Barqadle
(74) Attorney, Agent, or Firm—McDermott Will & Emery LLP (57) ABSTRACT

A server device and a client device are connected through the Internet and the server device provides predetermined information on demand by the client device. The client device starts obtaining time when it displays predetermined information provided by the server device and stops obtaining time when a response to displayed predetermined information is input. That is, the client device obtains the time period between a display of predetermined information and an input of the response. The client device sends the obtained time period to the server device through the Internet. The server device certifies the received time period. At the time of certifying, the server device checks if the time period data and the program for obtaining the time period are improperly altered or not.

28 Claims, 6 Drawing Sheets

COUNTED TIME PERIOD CERTIFYING SYSTEM

BACKGROUND OF THE INVENTION

1. Field of the Invention

The present invention relates to a technology to certify the time period to respond to information which is especially provided on-line.

2. Description of the Related Art

Recently, various kinds of information are provided through the Internet with the spread of computers. Generally, those kinds of information provided through the Internet used to be provided from a server device to a client device one-directionally. However, there appears such information as to be joined by users through bi-directional communication. With the use of such a bi-directional communication system, a server device can provide information which requires a response of each user such as a quiz.

Here, for example, a hayaoshi-quiz (a game show in which a person who pushes a button first answers first) can be realized by counting the time period it takes for users of client devices to respond to information provided by a server device. Conventionally, such a way has been considered as to obtain the time period between a transmission of information to a client device done by a sever device through the Internet and a reception by the server device of a response input in the client device, i.e., it is only the server device that obtains the time period for response.

However, there may be some differences in the length of the time period between the transmission of information by a server device and the reception of information by a client device depending on the condition of the communication channel, the faculty of the client device or the like. Further, there may be some differences also in the length of the time period between the input of a response in the client device and the reception of the response by the server device depending on the same problem.

It is difficult for a server device to separate the time needed for the process in a client device from the time needed for the communication process on the Internet. Accordingly, it is not appropriate to say that the time period for response measured by a server device equals to the time period needed for a user to respond and there has been unfairness in the measured result.

Further, in the case where the time period for response is measured in the way described above, a response from client devices reaches a server device intensively in a short time. Because of this, there have been such problems as congestion of communication and the system breakdown in the server device owing to the excessively loaded communication channel and the server device in the above-described way.

As discussed above, there has been no system for accurately measuring the time period needed for users to input a response to information sent by a server device from client devices and for the obtained time period being collected by the server device. Due to this, for example, an on-line test with a time limit or a network business transaction that is tight on the certification of time have not been realized.

SUMMARY OF THE INVENTION

It is an object of this invention to fairly and accurately certify the time period necessary for inputting a response to information sent through a network.

It is another object of this invention to collect the response to information sent through a network without excessively loading resources such as a network.

To achieve the above-mentioned objects, the obtained time period certifying system according to the first aspect of this invention comprises a server device for sending information which requires a response and a client device for inputting a response to sent information which is connected to the server device through a network wherein:

the client device comprises:
- an information receiving means for receiving information which is sent from the server device through the network;
- an outputting means for outputting information which the information receiving means receives;
- a response inputting means for inputting a response to information output from the outputting means;
- a time period obtaining means for obtaining a time period between the output of information from the outputting means and the input of the response to the response inputting means; and
- a time data sending means for sending time data including the time period obtained by the time period obtaining means to the server device through the network, the server device comprises:
- an information sending means for sending information which requires a response and is to be received by the information receiving means of the client device through the network;
- a time data receiving means for receiving the time data sent by the time data sending means through the network; and
- an obtained time period certifying means for certifying the time period between the output of information and the input of the response based on the time data which the time data receiving means receives.

In the above-described obtained time period certifying system, the time period between the output of information and the input of the response is obtained not in the server device but in the client device. The server device certifies the obtained time period based on the time data which it receives from the client device. Because of this, since the server device can receive the accurate time period between the output of information and the input of the response in the client device, the server device can fairly certify the time period even if there are some differences in the length of the time period for outputting information sent from the server device in the client device or in the length of the time period for sending the data to the server device from the client device depending on the condition of the network or the difference in the faculty of the client device.

In the above-described obtained time period certifying system, the client device may further comprise an encoding means for encoding the time data including the time period obtained by the time period obtaining means and giving the data to the time data sending means. And the server device may further comprise a decoding means for decoding the encoded time data which the time data receiving means receives.

As described above, by encoding the time data to send them to the server device, the time data can be prevented from being improperly altered on the network or the like. Because of this, the server device can further accurately and fairly certify the time period between the output of information and the input of the response in the client device.

In the above-described obtained time period certifying system, the client device may further comprise a scheduling means for adjusting the timing at which the time data sending means sends the time data to the server device.

The above-described obtained time period certifying system may further comprise an intermediate device which is on the network between the server device and the client device and intermediates the sending of the time data from the client device to the server device. In this case, the intermediate device may comprise a means for receiving the time data launched to the network by the time data sending means, a means for sending the time data which the means receives to the server device through the network and a scheduling means for adjusting the timing at which the means sends the time data to the server device.

As described above, due to the client device or the intermediate device comprising a scheduling means, the timings at which the time data receiving means of the server device receives the time data are dispersed if the time data are sent from more than one client devices. Because of this, situations such as congestion on the network and the system breakdown in the server device owing to the excessively loaded network or server device can be prevented.

To achieve the above-mentioned objects, the obtained time period certifying system according to the second aspect of this invention comprises a server device for sending information which requires a response and a client device for inputting a response to sent information which is connected to the server device through a network wherein:

the client device
 comprises a memory for storing programs, a processor for executing the programs, a timer for keeping time, an inputting device for inputting information, an outputting device for outputting information and a first communication device for sending information to and receiving information from the server device;
 outputs information which requires a response from the outputting device;
 inputs a response to output information which requires a response from the inputting device;
 obtains a time period between the output of predetermined information and the input of the response by using the timer; and
 sends the obtained time data from the first communication device to the server device through the network and the server device
 comprises a memory for storing programs, a processor for executing the programs and a second communication device for sending information to and receiving information from the terminal device;
 receives the time data sent from the client device by operating the second communication device; and
 certifies the time period between the output of information which requires a response and the input of the response in the client device based on the time data which the second communication device receives.

To achieve the above-mentioned objects, the obtained time period certifying method according to the third aspect of this invention is a method for certifying a time period between a provision of information and an input of a response in a system which comprises a server device for sending information which requires a response and a client device for inputting a response to sent information which is connected to the server device through a network, the method comprising steps of:

sending information from the server device to the client device through the network;
outputting sent information from the client device;
inputting the response to output information from the client device;
obtaining the time period between the output of information and the input of the response in the client device;
sending time data including the obtained time period from the client device to the server device through the network; and
certifying the time period between the output of information and the input of the response in the server device based on the sent time data.

To achieve the above-mentioned objects, the obtained time period certifying method according to the fourth aspect of this invention is a method for certifying a time period necessary for responding to information sent to a terminal device through a network, wherein the time period between an output of sent information and an input of a response is obtained in the terminal device, and the method collects and certifies the obtained time period.

To achieve the above-mentioned objects, the server device according to the fifth aspect of this invention is connected to a client device through a network, comprising:

a time data receiving means for receiving time data including a time period between an output of information which requires a response and an input of a response in the client device, from the client device through the network; and
an obtained time period certifying means for certifying the time period between the output of information which requires a response and the input of the response in the client device based on the time data which the time data receiving means receives.

The above server device may further comprise an information sending means for sending information which requires a response to the client device through the network.

In this case, the above server device may further comprise a first program sending means for sending a time period obtaining program for obtaining the time period between the output of sent information and the input of the response in the client device, to the client device.

Here, it is preferable that the time period obtaining program sent by the first program sending means is not reusable.

In the above server device, the time data sent from the client device through the network may be encoded. In this case, the above server device may further comprise a decoding means for decoding the encoded time data which the time date receiving means receives.

Here, the above server device may further comprise a second program sending means for sending an encoding program for the client device to encode the time data, to the client device.

Also, the above server device may further comprise a third program sending means for sending a scheduling program for the client device or an intermediate device which is on the network between the server device and the client device to adjust the timing to send the time data through the network to the client device or the intermediate device.

The above server device may further comprise a program checking means for checking if the time data which the time data receiving means receives are created by a proper program. In this case, the obtained time period certifying means can further certify the time period between the output of information which requires a response and the input of the response in the client device based on the check result of the program checking means.

To achieve the above-mentioned objects, the server device according to the sixth aspect of this invention is connected to a client device through a network and comprises a memory for storing programs, a processor for executing the programs and a communication device for sending information to and receiving information from the client device wherein:

the communication device receives time data about a time period between an output of information which requires a response and a predetermined input in the client device which is obtained in the client device, from the client device through the network; and the time period between the output of predetermined information and the predetermined input in the client device is certified based on the time data which the second communication device receives.

To achieve the above-mentioned objects, the client device according to the seventh aspect of this invention is connected to a server device through a network, comprising:

an outputting means for outputting information which requires a response;

a response inputting means for inputting a response to information output from the outputting means;

a time period obtaining means for obtaining a time period between the output of information which requires a response from the outputting means and the input of the response to the response inputting means; and a time data sending means for sending time data including the time period obtained by the time period obtaining means to the server device through the network.

The above client device may further comprise an information receiving means for receiving information which requires a response from the server device through the network.

In the above client device, the time period obtaining means may comprise, for example:

a means for retrieving a time kept by an inner timer when information sent from the server device is output from the outputting means;

a means for retrieving a time kept by an inner timer when the response is input to the response inputting means; and a means for calculating the gap between these retrieved times.

It Is preferable that the above client device further comprises an encoding means for encoding the time data including the time period obtained by the time period obtaining means and giving the data to the time data sending means.

Also it is preferable that the above client device further comprises a scheduling means for adjusting the timing at which the time data sending means sends the time data to the server device.

To achieve the above-mentioned objects, the client device according to the eighth aspect of this invention is connected to a server device through a network and comprises a memory for storing programs, a processor for executing the programs, a timer for keeping time, an inputting device for inputting information, an outputting device for outputting information and a communication device for sending information to and receiving information from the server device;

outputs information which requires a response from the output device;

performs a predetermined input to output information which requires a response to the inputting device;

obtains a time period between the output of information which requires a response and the predetermined input by using the timer; and sends the obtained time data from the first communication device to the server device through the network.

To achieve the above-mentioned objects, the computer-readable recording medium which stores a program according to the ninth aspect of this invention is characterized in that the program realizes:

an information sending function for sending information which requires a response to a terminal device which is connected through a network;

a time data receiving function for receiving time data including a time period between an output of information sent by the information sending function and an input of a response in the terminal device, from the terminal device through the network; and an obtained time period certifying function for certifying the time period between the output of information and the input of the response in the terminal device based on the time data which the time data receiving function receives in a computer device which is connected to the terminal device through the network.

To achieve the above-mentioned objects, the computer-readable recording medium which stores data and a program according to the tenth aspect of this invention is characterized in that:

the data include information which requires a predetermined response and is to be output from the computer;

the program realizes:

a response inputting function to control a response to output information to be input from outside;

a time period obtaining function to obtain a time period between an output of information which requires a response and an input of a response; and a time data sending function to send time data including the time period obtained according to the time period obtaining function, through the network in a computer device; and the data and program are to be sent as one body to a computer device which is connected through a network.

In the above computer-readable recording medium, it is preferable that the program further realizes an encoding function for encoding the time data including the time period obtained according to the time period obtaining function and giving the data to the time data sending function, in the computer device.

In the above computer-readable recording medium, the program further realizes a scheduling function to adjust the timing at which the time data sending function sends the time data, in the computer device.

To achieve the above-mentioned objects, the program data signal which is superimposed in a carrier wave and sent through a communication channel according to the eleventh aspect of this invention controls a computer device which is connected to a plurality of terminal devices through a network to function as:

an information sending means for sending information which requires a response to terminal devices which are connected through a network;

a time data receiving means for receiving time data including a time period between an output of information sent by the information sending means and an input of a response, from the terminal device through the network; and an obtained time period certifying means for certifying the time period between the output of information and the input of the response in the terminal devices based on the time data which the time data receiving means receives.

To achieve the above-mentioned objects, the data signal which is superimposed in a carrier wave and sent through a communication channel according to the twelfth aspect of this invention is a signal for sending data and a program as one body to a computer device which is connected through a network wherein:

the data include information which requires a predetermined response and is to be output from the computer device; and the program controls the computer to function as:
a response inputting means for controlling a response to output information to be input from outside;
a time period obtaining means for obtaining a time period between an output of information which requires a response and an input of a response to the response inputting means; and
a time data sending means for sending time data including the time period obtained by the time period obtaining means, through the network.

BRIEF DESCRIPTION OF THE DRAWINGS

FIG. 2A is a diagram illustrating the structure of the server device in FIG. 1 and the FIG. 2B is a diagram illustrating the structure of the client device in FIG. 1.

DETAILED DESCRIPTION OF THE PREFERRED EMBODIMENTS

An embodiment of the present invention will now be described below with reference to the accompanying drawings.

Figure 1:
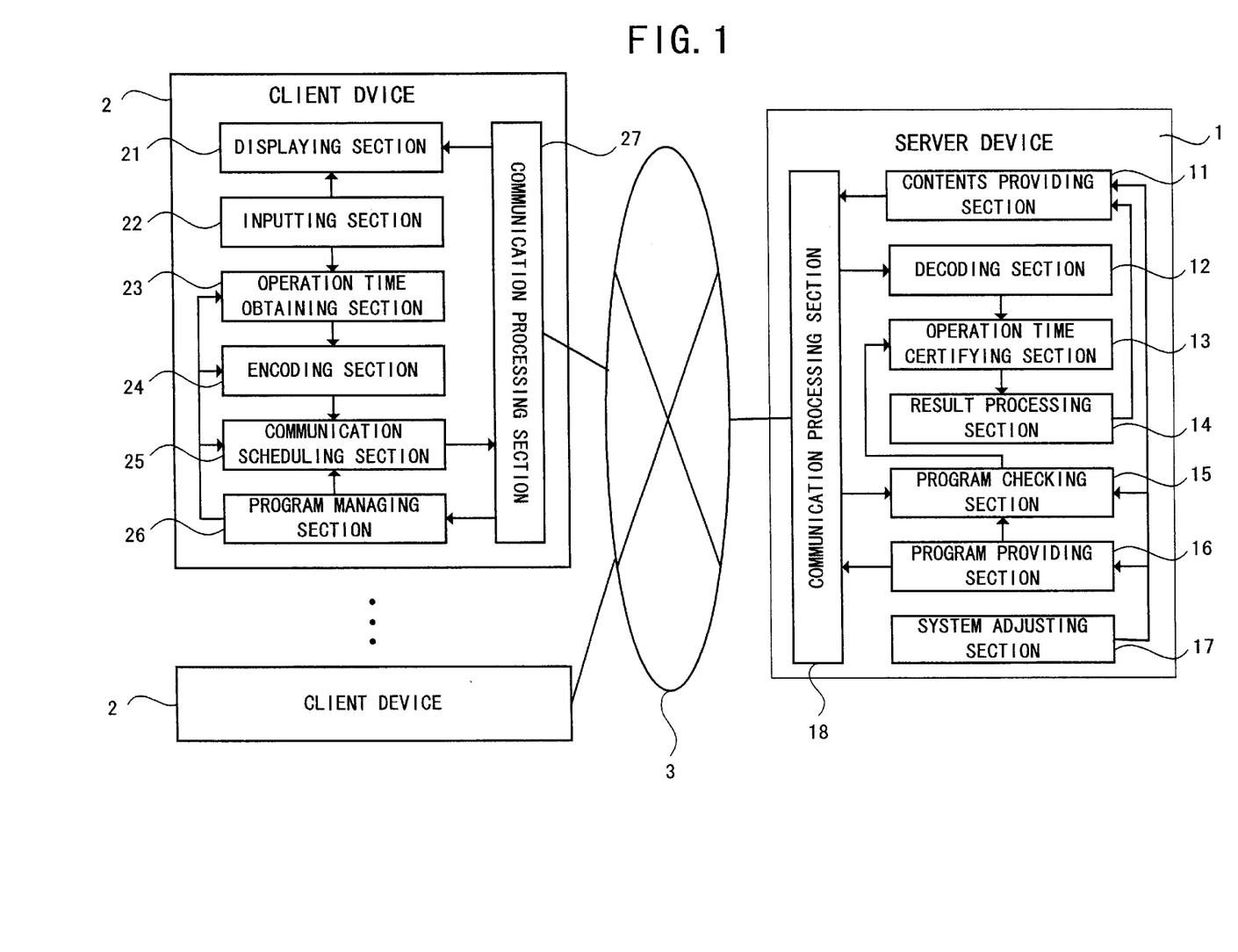
FIG. 1 is a block diagram which illustrates the structure of the obtained time period certifying system according to the embodiment of the present invention.

FIG. 1 is a block diagram illustrating the structure of the obtained time period certifying system according to this embodiment. As illustrated, this obtained time period certifying system comprises a server device 1 and a plurality of client devices 2 which are connected to the server device 1 through the Internet 3.

The server device 1 comprises each of those functions, a contents providing section 11, a decoding section 12, an operation time certifying section 13, a result processing section 14, a program checking section 15, a program providing section 16, a system adjusting section 17 and a communication processing section 18.

Figures 2A, 2B:
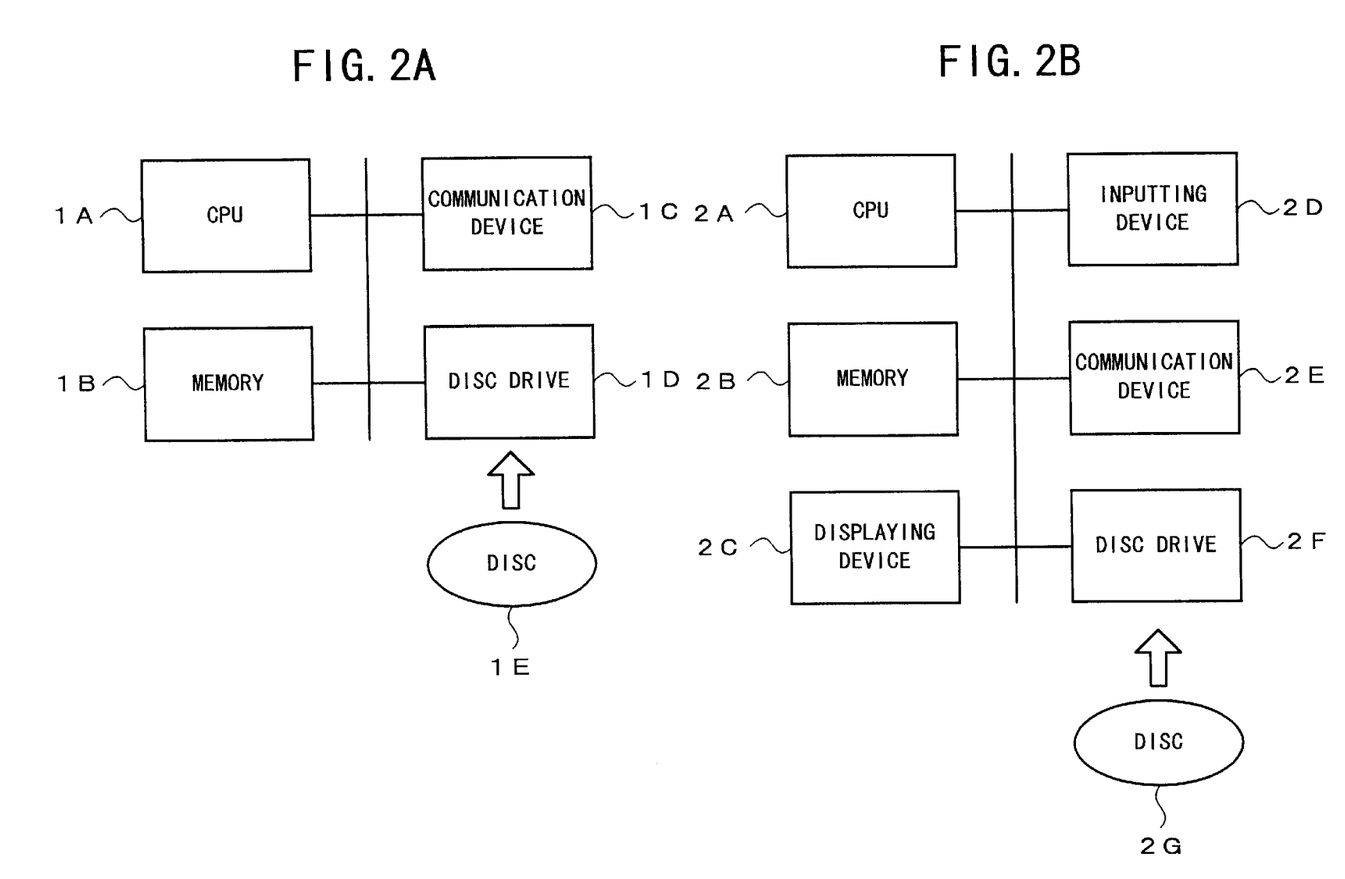

The server device 1 comprises, as illustrated in FIG. 2A, a CPU (including an inner timer) 1A, a memory 1B, a communication device 1C, a disc drive 1D and the like as hardware for realizing each of the sections 11 to 18. A program for realizing the functions of sections 101 to 104 is stored in a disc 1E to be provided, read by a disc drive 1D to be stored in the memory 1B. This program may be superimposed in a carrier wave and sent from other computer devices (not shown) through the Internet 3, received by the communication device IC to be stored in the memory 1B. The CPU 1A realizes the functions of the sections 11 to 18 by executing the program stored in the memory 1B.

The contents providing section 11 provides contents previously stored in fixed discs or the like comprising the memory 1B according to the instruction from the result processing section 14, adding some changes if necessary, to the client device 2 which is logically connected to the server device 1. The contents to be provided are given to the communication processing section 18 and sent to the client device 2. The contents to be provided by the contents providing section 11 include information to which users of the client devices 2 need to input a response as discussed later.

The decoding section 12 decodes the encoded capsule data discussed later which the communication processing section 18 receives from the client device 2 and gives decoded data to the operation time certifying section 13. The operation time certifying section 13 certifies the operation time in the client device 2 (discussed later) based on information of the decoded data and the check result of the program checking section 15.

The result processing section 14 gives instruction to adjust information to be provided as contents to the contents providing section 11 according to the result of the operation time in the client device 2 certified by the operation time certifying section 13. The program checking section 15 decompresses program capsule data (discussed later) which the communication processing section 18 receives from the client device 2 and checks whether the provided programs have been improperly altered or not by comparing the decompressed data with the programs provided by the program providing section 16. The program checking section 15 gives the check result to the operation time certifying section 13.

The program providing section 16 provides an operation time obtaining program, an encoding program and a scheduling program (these are discussed later) to the client device 2 which is logically connected to the server device 1. Those programs to be provided are given to the communication processing section 18 and then sent to the client device 2.

The system adjusting section 17 controls the operation of the contents providing section 11, the program checking section 15 and the program providing section 16. Specifically, the system adjusting section 17 controls the program providing section 16 to provide the operation time obtaining program, the encoding program and the scheduling program before the contents providing section 11 provides information as contents which requires a response of each user. The system adjusting section 17 controls the program providing section 16 to give the programs to the program checking section 15 when the program checking section 15 checks the validity of the programs.

The communication processing section 18 sends the contents provided by the contents providing section 11 and the operation time obtaining program, the encoding program and the scheduling program provided by the program providing section 16 to the client device 2 through the Internet 3. The communication processing section 18 also receives the encoded capsule data and the program capsule data (each of those is discussed later) sent from the client device 2 through the Internet 3 and then gives each of the programs to the decoding section 12 and the program checking section 15.

The client device 2 comprises each of those functions, a displaying section 21, an inputting section 22, an operation time obtaining (counting) section 23, an encoding section 24, a communication scheduling section 25, a program managing section 26 and a communication processing section 27.

The client device 2 comprises a CPU 2A, a memory 2B, an inputting device 2C, a displaying device 2D, a communication device 2E, a disc drive 2F and the like as hardware for realizing each of the sections 21 to 27. A program for realizing the functions of the sections 21 to 27 is stored in a disc 2G to be provided, read by a disc drive 2F to be stored in the memory 2B. This program may be superimposed in a carrier wave and sent from the server device or other computer devices through the Internet 3, received by the communication device 2E to be stored in the memory 2B. The CPU 2A realizes the functions of the sections 21 to 27 by executing the program stored in the memory 2B.

The displaying section 21 displays the contents provided from the contents providing section 11 of the server device 1. The displaying section 21 switches the contents to be displayed from information of the first page to information which requires a responses of each user in accordance with an input to switch display.

The inputting section 22 inputs a display switch input to switch the contents displayed on the displaying section 21 in accordance with the users' operation. The inputting section 22 also inputs a response to information displayed as contents which requires a response of each user in accordance with the users' operation.

The operation time obtaining section 23 is realized by the time obtaining (counting) program managed by the program managing section 26 and obtains (counts) the time period between a starting operation and a responding operation performed in the inputting section 22 by the users of the client devices 2 (hereinafter, referred to as "operation time") by using, for example, the inner timer contained in the CPU 2A. The operation time obtaining section 23 gives the obtained operation time to the encoding section 24.

The encoding section 24 is realized by the encoding program managed by the program managing section 26 and combines the operation time given by the operation time obtaining section 23 with ID of the contents, ID of the client device 2 or its user, and information of the input response if necessary, and then encodes the combined information. Hereinafter, this encoded data are referred to as encoded capsule data. The encoding section 24 gives the created encoded capsule data to the communication scheduling section 25.

The communication scheduling section 25 is realized by the scheduling program managed by the program managing section 26 and adjusts the timing at which the encoded capsule data given from the encoding section 24 and the program capsule data given from the program managing section 26 (discussed later) are sent to the server device 1.

The program managing section 26 manages the operation time obtaining program, the encoding program, and the scheduling program provided by the program providing section 16 of the server device 1 and received by the communication processing section 27. The section 26 realizes each of the operation time obtaining section 23, the encoding section 24 and the communication scheduling section 25 by using those programs. The program managing section 26 also combines each of the programs with ID of the contents and ID of the client device 2 (or its user) and then compresses the combined programs when the obtainment of the operation time and the encoding process are performed. Hereinafter, those compressed programs are referred to as program capsule data. The program managing section 26 gives the created program capsule data to the communication scheduling section 25.

The communication processing section 27 receives contents and programs sent from the server device 1 through the Internet 3 and gives each of those to the displaying section 21 and the program managing section 26 respectively. The communication processing section 27 also sends the encoded capsule data and the program capsule data given from the communication scheduling section 25 to the server device 1 through the Internet 3.

The operation of the obtained time period certifying system according to this embodiment will now be discussed below. First, processes practiced to certify the operation time in the server device 1 and the client device 2 comprised in this obtained time period certifying system will be discussed.

Figure 3:
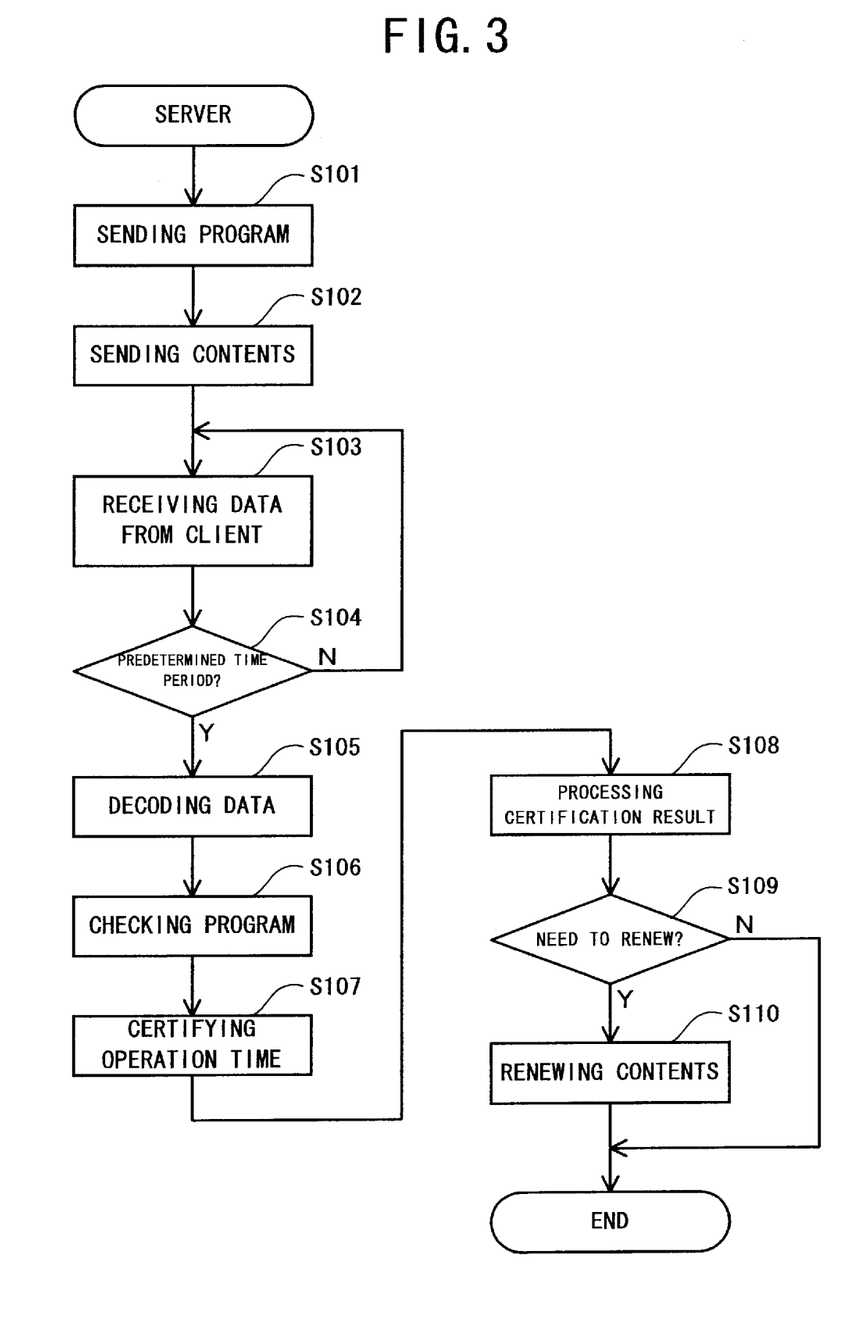
FIG. 3 is a flowchart showing the processes performed by the server device in FIG. 1.

FIG. 3 is a flowchart showing the processes performed in the server device 1 in FIG. 1. In the case where information as contents which requires a response of each user is sent to the client device 2, first, the program providing section 16 controls the communication processing section 18 to send the time obtaining program, the encoding program and the scheduling program (step S101).

Next, the contents providing section 11 controls the communication processing section 18 to send information which has been previously created and stored in a fixed disc device or the like composing the memory 1B and requires a response of each user to all the client devices 2 connected to the server device 1 (step S102).

After this, the server device 1 waits until the communication processing section 18 receives the encoded capsule data and the program capsule data from the client devices 2. Specifically, the server device 1 continues the operation of receiving the encoded capsule data and the program capsule data from the client device 2 in the predetermined time period which is determined by taking the sending schedule set by the sent scheduling program and the possible delay of communication on the Internet 3 into consideration (steps S103, S104).

After the predetermined time period in which the encoded capsule data and the program capsule data is to be received has passed, the decoding section 12 decodes each of the received encoded capsule data and gives them to the operation time certifying section 13 (step S105). The program checking section 15 decompresses each of the received program capsule data and checks whether the program used for obtaining the operation time in the client device 2 is valid one by comparing the decompressed program with the program provided by the program providing section 16. The program checking section 15 gives the check result to the operation time certifying section 13 (step S106).

Next, the operation time certifying section 13 certifies the operation time obtained in the client device 2 based on the decoded capsule data and the check result by the program checking section 15. Specifically, if the encoded capsule data is decoded correctly and the check result shows the correspondence of the programs, the operation time obtained in the client device 2 is certified as valid (step S107).

Next, the result processing section 14 receives the certification result of the operation time in the operation time certifying section 13 and performs predetermined processes based on the received result (step S108). The result processing section 14 judges the necessity to renew the contents to be provided by the contents providing section 11 based on the result of performing the predetermined processes (step S109).

If there is the need to renew the contents, the result processing section 14 gives the processing result to the contents providing section 11 and the contents providing section 11 renews the contents based on the received processing result (step S110). Now, the processes in this flowchart have been finished. On the other hand, if there is no need to renew the contents, the processes in this flowchart will be finished without any other operation.

Figure 4:
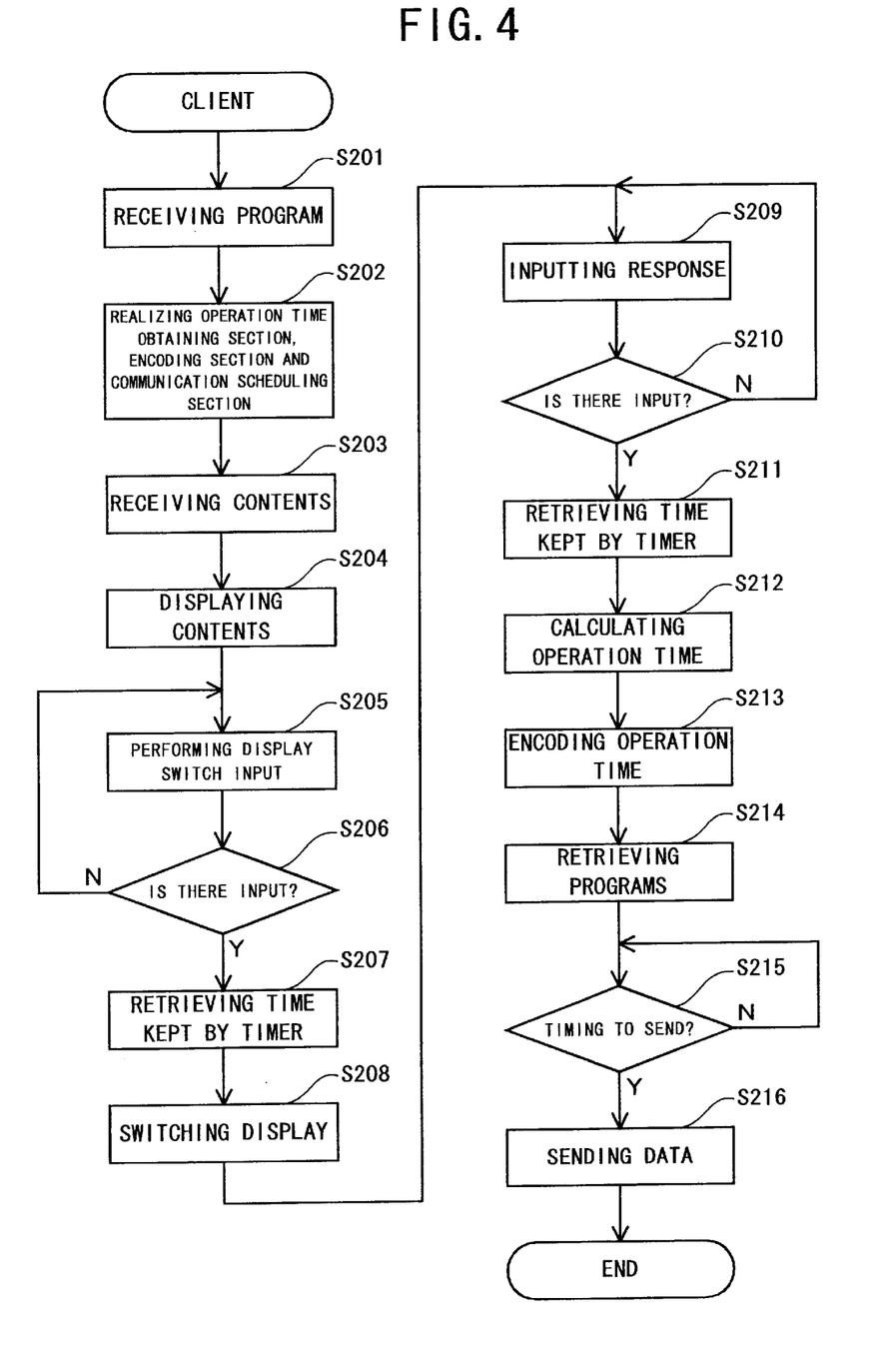
FIG. 4 is a flowchart showing the processes performed by the client device in FIG. 1.

FIG. 4 is a flowchart showing the processes performed in the client device 2 in FIG. 101. First, the communication processing section 27 receives the time obtaining program, the encoding program and the scheduling program sent from the server device 1 in step S101 and gives them to the program managing section 26 (step S201). The program managing section 26 receives the time obtaining program, the encoding program and the scheduling program from the communication processing section 27 and realizes the operation time obtaining section 23, the encoding section 24 and the communication scheduling section 25 by using each of the programs (step S202).

Next, the communication processing section 27 receives the contents sent from the server device 1 in step S102 and gives them to the displaying section 21 (step S203). The displaying section 21 displays the received contents. Information which requires a response of each user will not be displayed on the displaying section 21 at this stage although the received contents contain information which requires a response of each user (step S204).

Next, users of the client device 2 perform a display switch input by operating the inputting section 22 (step S205). The inputting section 22 judges if the display switch input has been performed or not (step S206). The processes of steps S205 and S206 will be repeated until the display switch input is recognized.

If it is Judged that the display switch input has been performmned, the inputting section 22 gives information to show the judgement to the operation time obtaining section 23 and the displaying section 21. In response to above information, the operation time obtaining section 23 retrieves the current time kept by the inner timer of the CPU 2A (step S207). And, the displaying section 21 displays information which requires a response of each user (step S208).

Next, the users of the client devices 2 input a response by operating the inputting section 22 according to displayed information (step S209). The inputting section 22 judges if the response has been input or not (step S210). The processes of the steps S209 and S210 will be repeated until the response is input.

If it is judged that the response has been input, the inputting section 22 gives information to show that the response has been input to the operation time obtaining section 23. Then, the operation time obtaining section 23 retrieves the current time kept by the inner timer (step S211) and calculates the operation time which is the gap between the current time retrieved now and the time retrieved in step S207. The operation time obtaining section 23 gives the obtained operation time to the encoding section 24 (step S212).

Next, the encoding section 24 combines the operation time received from the operation time obtaining section 24 with ID of the contents, ID of the client device 2 (or its user) and if necessary, information which shows the response input from the inputting section 22 in step S209. And the encoding section 24 encodes combined information to create the encoded capsule data and gives the data to the communication scheduling section 25 (step S213).

Further, the program managing section 26 retrieves the modules from the program which is necessary for realizing the operation time obtaining section 23 and actually used for obtaining the operation time and the program which is necessary for realizing the encoding section 24 and used for creating the encoded capsule data. And the program managing section 26 compresses the retrieved modules to create the program capsule data and gives the data to the communication scheduling section 25 (step S214).

The communication scheduling section 25 judges whether it comes the sending timing set by the scheduling program after retrieving the encoded capsule data from the encoding section 24 and the program capsule data from the program managing section 26 (step S215). The process of step S215 will be repeated until the sending timing comes.

If it is judged to be the sending timing, the communication scheduling section 25 controls to send the encoded capsule data received from the encoding section 24 and the program capsule data received from the program managing section 26 to the server device 1 from the communication processing section 27 through the Internet 3 (step S216). Then, the processes in this flowchart will be finished.

Figure 5:
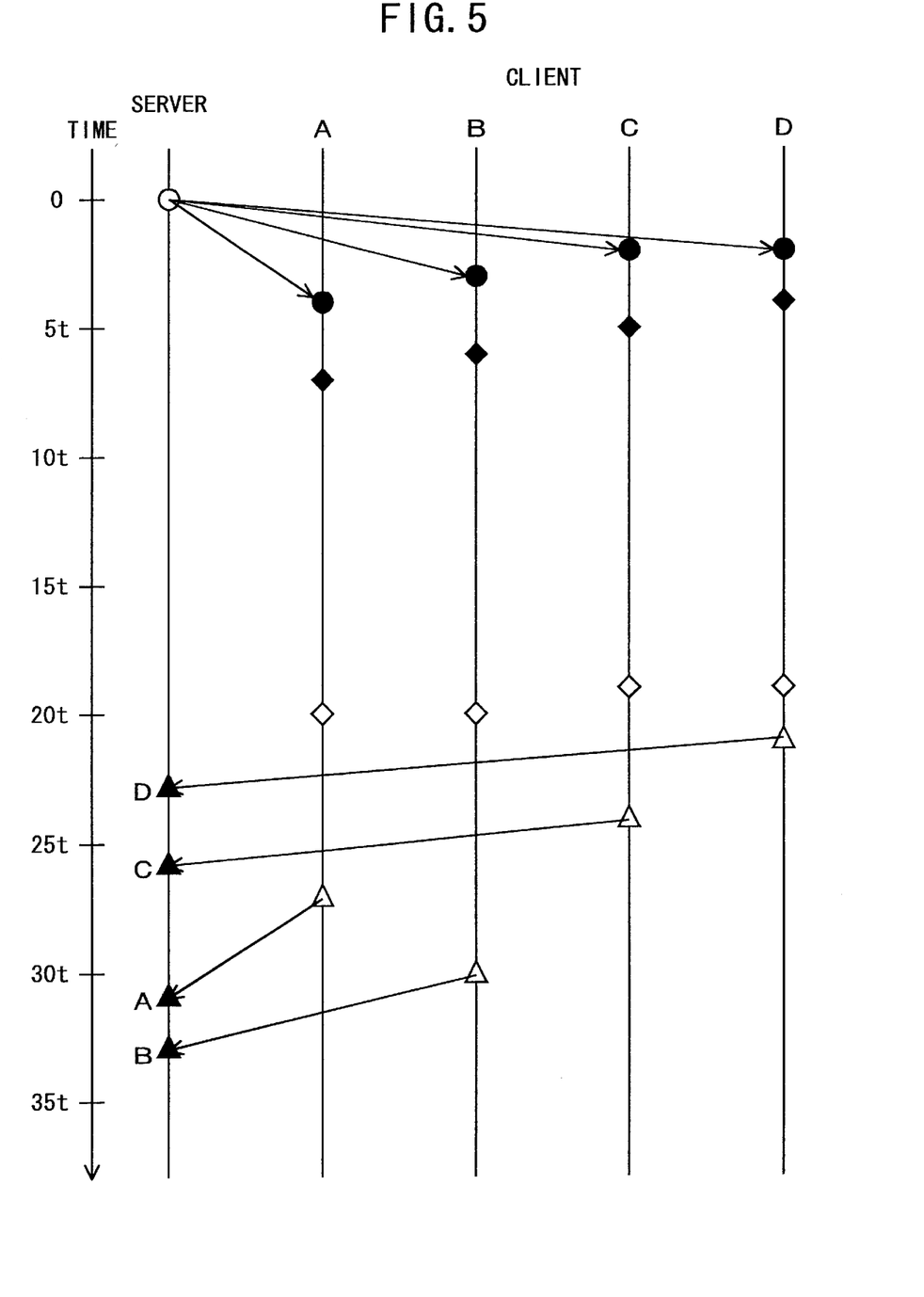
FIG. 5 is a timing chart showing the processes to certify an obtained time period according to the embodiment of the present invention.

The processes from sending information from the server device 1 to the client device 2 until certifying the time period for operating upon above information in each of the client devices 2 in the obtained time period certifying system according to this embodiment will now be described below with reference to the timing chart in FIG. 5. Here, the four client devices 2 of A to D are assumed to be connected to the server device 1. And it is assumed that the time obtaining program, the encoding program and the scheduling program have previously been sent to the client devices 2 of A to D and that the operation time obtaining section 23, the encoding section 24 and the communication scheduling section 25 have been realized in the four client devices 2 of A to D. The server device 1 sends information as contents which requires a response of each user to the connected client devices 2 of A to D at the time 0 (illustrated by the white circle in the figure). The communication processing section 27 of each client device 2 receives sent information through the Internet 3 and the timings at which each of the client devices 2 of A to D finishes receiving information are 4t, 3t, 2t and 2t respectively (illustrated by the black circles in the figure) depending on the communication channel on the Internet 3 or the faculty of each of the communication processing sections 27 (more specifically, the communication device 2E which realizes this section).

Each user needs to operate the inputting section 22 to perform the display switch input since information which requires a response is not displayed on the displaying section 21 of each of the client devices 2 of A to D at this stage. Here, it is assumed that the timings at which the display switch input is performed in each of the four client devices 2 of A to D are 7t, 6t, 5t and 4t respectively (illustrated by the black squares in the figure). Information which requires a response is displayed on each displaying section 21 in the four client devices 2 of A to D at this point for the first time.

Next, the users of each of the client devices 2 of A to D operate the inputting section 22 to input a response based on information displayed on the displaying section 21. Then, it is assumed that the timings at which the response is input in each of the four client devices 2 of A to D are 20t, 20t, 19t and 19t respectively (illustrated by the white squares). From these, each of the operation time obtaining section 23 in the four client devices 2 of A to D obtains 13t, 14t, 14t and 15t as the operation time respectively.

Next, the encoding section 24 of the four client devices 2 of A to D creates the encoded capsule data which contain the obtained operation time and gives the data to the communication scheduling section 25. And the program managing section 26 of the four client devices 2 of A to D creates the program capsule data and gives the data to the communication scheduling section 25. The communication scheduling section 25 of each of the client devices 2 of A to D adjusts the schedule of the timing to send both the encoded capsule data and the program capsule data to the server device 1 at timing of 27t, 30t, 24t, and 21t respectively (illustrated by the white triangles in the figure).

The server device 1 receives the encoded capsule data and the program capsule data sent from each of the client devices 2 of A to D at 31t, 33t, 26t, and 23t respectively (illustrated by the black triangles in the figure) depending on the difference of the length of the communication channel or the circumstance on the Internet 3. And the operation time certifying section 13 in the server device 1 certifies the operation times in the four client devices 2 of A to D as 13t, 14t, 14t, and 15t respectively based on the received encoded capsule data and program capsule data.

As apparent from the above explanation, the order of the timings at which the response was input from the inputting section 22 in each of the client devices 2 is C and D (same timing), A and B (same timing). The order of the timing at which the server device 1 received the data from each of the client devices 2 is D, C, A, B. However, the operation time in each of the client devices 2 certified by the server device 1 is equal to the time period between the display switch input and the input of the response. The order of the operation times is A, B and C (same timing), D.

And it is apparent that although the timings at which the response was input from the inputting section 22 in each of the client devices 2 of A to D are very close just exemplified as 20t, 20t, 19t, and 19t respectively, the timings at which the server device 1 received the encoded capsule data and the program capsule data from each of the client devices 2 of A to D are dispersed as 31t, 33t, 26t, and 23t respectively due to the scheduling adjustment performed by the communication scheduling section 25.

As discussed above, in the obtained time period certifying system according to this embodiment, the operation time between a display of information which requires a response on the displaying section 21 and an input of a response to such information from the inputting section 22 is obtained by the operation time obtaining section 23 realized in the client device 2. Because of this, the server device 1 can certify only the actual operation time in the client device 2 even if the display of sent information on the displaying section 21 or the return of the data to the server device 1 are delayed owing to the difference of the communication channel on the Internet 3 or the faculty of the client device 2. And this enables the operation time certifying section 13 to accurately and fairly certify the time period between the output of information and the input of the response.

The program checking section 15 realized in the server device 1 checks whether the program which is used for obtaining the operation time in the client device 2 has been changed or not. Since this does not allow the improperly obtained operation time to be certified as the valid operation time, the operation time certifying section 13 can further accurately and fairly certify the time period between the output of information and the input of the response.

In the client device 2, the program managing section 26 realizes the encoding section 24 by using the encoding program sent from the server device 1 to the client device 2. The realized encoding section 24 encodes the data including the operation time obtained by the operation time obtaining section 23. This prevents the operation time data from being improperly altered on the Internet 3 and the operation time certifying section 13 can further accurately and fairly certify the time period between the output of information and the input of the response.

Further, in the obtained time period certifying system according to this embodiment, the server device 1 sends the scheduling program to the client device 2 and the program managing section 26 realizes the communication scheduling section 25 in the client device 2. And the realized communication scheduling section 25 adjusts the schedule of sending the encoded capsule data and the program capsule data to the server device 1. Because of this, the encoded capsule data and the program capsule data are not intensively sent to the server device 1. And the server device 1 and the communication channel connected to this are not excessively loaded. Therefore, the system breakdown is prevented in the server device 1.

Especially, in the obtained time period certifying system according to this embodiment, since the data sent to the server device 1 from the client device 2 are the encoded capsule data which are encoded after defined as the obtainment result of the time period, they are the suitable data whose sending timing is to be adjusted.

By the way, the times kept by each of the inner timers provided in the client device 2 are often not consistent. However, the operation time obtaining section 23 retrieves the time at which the display switch input is performed and the time at which the response is input from the inner timer and calculates the gap between those times as the operation time. Accordingly, no problem happens due to the inconsistency of the times kept by each of the inner timers. The inner timer keeps time usually by using the crystal pulse oscillator which is characterized by a very accurate oscillation cycle. Due to this, the time period between the display switch input and the input of the response obtained in the client device 2 contains only an error which can be substantially ignored.

This invention is not limited to the above-described embodiment but various modifications are possible. Examples of modifications of the obtained time period certifying system according to the above-described embodiment will now be described below.

In the above-described embodiment, the operation time obtaining section 23 obtains the operation time by retrieving the times kept by the inner timer when the display switch input and the input of the response are performed and calculating the gap between those times. However, the method for obtaining the operation time is not limited to this. For example, the operation time obtaining section 23 may have a counter which counts up or down at every predetermined time. It is possible to compare the lengths of the operation time by simply using the number counted by this counter.

According to the above-described embodiment, information which requires a response is displayed on the displaying section 21 in accordance with the display switch input from the inputting section 22. However, the timing at which the display of information which requires a response is started is not limited to when there is such a display switch input.

According to the above-described embodiment, in order to inspect that there is no injustice in obtaining the operation time, the program checking section 15 realized in the server device 1 checks whether the program used for realizing the operation time obtaining section 23 in the client device 2 is the valid one or not. On the other hand, in order to prevent the injustice in obtaining the operation time, the program providing section 16 in the server device 1 may provide an operation time obtaining program which is not reusable immediately before the contents providing section 11 provides information which requires a response.

According to the above-described embodiment, the program managing section 26 only compresses the modules of the program necessary for realizing the operation time obtaining section 23 to create the program capsule data before giving them to the communication scheduling section 25. On the other hand, the program managing section 26 may give the created program capsule data to the encoding section 24 and then the encoding section 24 may encode the program capsule data and give the data to the communication scheduling section 25. Especially, if the amount of data is small, the program managing section 26 may give the program capsule data to the communication scheduling section 25 without compressing nor encoding the data.

According to the above-described embodiment, the server device 1 sends the contents including information which requires a response simultaneously to all the client devices 2 logically connected through the Internet 3. However, the server device 1 may send the contents including information which requires a response when a request comes from the client device 2. Also, information which requires a response may not necessarily be provided to the client device 2 from the server device 1 through the Internet 3. Information which requires a response may, for example, be stored in the disc 2G to be provided and read by the disc drive 2F from the disc 2G.

According to the above-described embodiment, the programs for realizing the operation time obtaining section 23, the encoding section 24 and the communication scheduling section 25 in the client device 2 are sent from the server device 1 through the Internet 3. However, those programs may be provided to the disc 2G and read by the disc drive 2F. In this case, the server device 1 may send the encode key to be used by the encoding section 24 for encoding and information which shows the sending schedule which is adjusted by the communication scheduling section 25 to the client device 2.

According to the above-described embodiment, the provision of information, which requires a response performed by the contents providing section 11 and the provision of the operation time obtaining program, the encoding program and the scheduling program performed by the program providing section 16 are individually implemented. However, those information and programs may be sent from the server device 1 to the client device 2 through the Internet 3 as one body.

For example, the contents to be displayed on the browser may be composed of both of information which requires a response and the programs which are described in the Java Script or the like and the client device 2 may execute the program to display information under the control of the browser. The contents may be stored in a fixed disc comprised in the memory 1B in the server device 1 and read from here to be sent to the client device 2. The program for the part relating to obtaining the operation time may not be reusable in a case such as this.

According to the above-described embodiment, the obtained time period certifying system was explained on the premise that there is only one piece of information which requires a response and that users of the client devices 2 input a response only once. However, an obtained time period certifying system in which there are several pieces of information which requires a response and users have to input responses several times may be realized. For example, when the display switch input is performed from the inputting section 22, several pieces of information which requires a response are displayed a piece after another on the displaying section 21 and the user is to input responses to each piece of information. The first piece of information which requires a response may be displayed on the displaying section 21 when the display switch input is performed, and the next piece of information may be displayed on the displaying section 21 every time the response is input from the inputting section 22. The operation time obtaining section 23 may retrieve the time kept by the inner timer of the CPU 2A when all responses have been input and obtain the operation time by calculating the gap between this and the time retrieved when the display switch input is performed.

Figure 6:
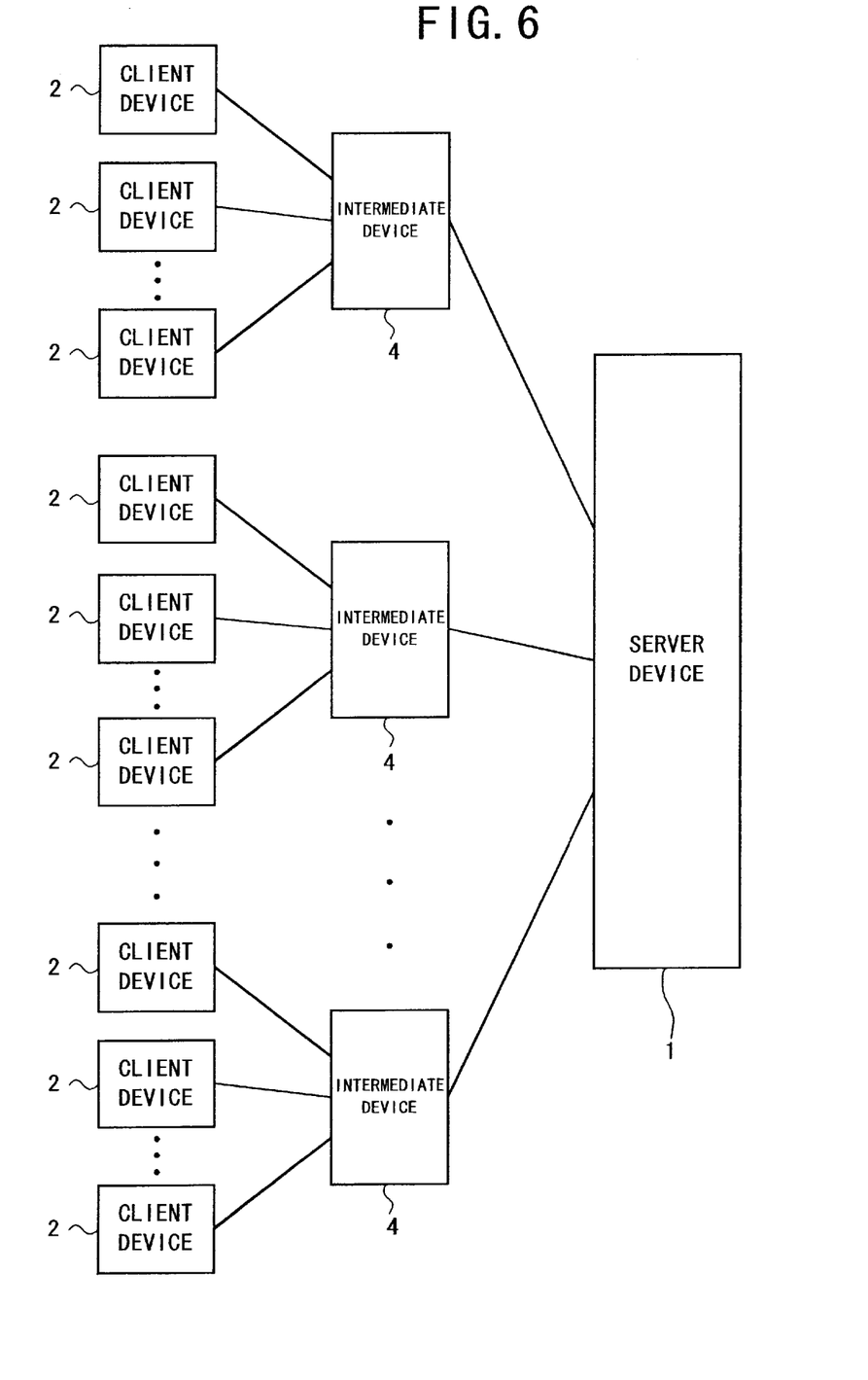
FIG. 6 is a block diagram illustrating the structure of the obtained time period certifying system according to a modification of embodiment of the present invention.

According to the above-described embodiment, the communication scheduling section 25 realized in the client device 2 adjusts the timing to send the encoded capsule data and the program capsule data to the server device 1. On the other hand, as shown in FIG. 6, intermediate devices 4 which are provided on the communication channel between the client devices 2 and the server device 1 may adjust the timing to send the encoded capsule data and the program capsule data.

In this case, the server device 1 may send the scheduling program for realizing the communication scheduling section in the intermediate devices 4, to each of the intermediate devices 4. Each of the intermediate devices 4 may receive the encoded capsule data and the program capsule data sent from the client device 2 and controls the communication scheduling section to adjust the timing to send the data to the server device 1.

According to the above-described embodiment, a system in which the server device 1 and the client device 2 are connected through the Internet 3 is applied. However, this invention may be applied to a system in which a server device and terminal devices are connected through a closed commercial network. This invention may be applied to a system in which various kinds of information are sent through a base station to cellular phones as the terminal devices.

The obtained time period certifying system discussed above can be applied to various network systems in which services are provided through a network such as the Internet. Examples of network systems applying the above obtained time period certifying system will now be discussed below.

First, the above-described obtained time period certifying system can be applied to realize a hayaoshi-quiz (a game show in which a person who pushes a button first answers first) through bi-directional communication using a network. That is, the client device 2 displays the quiz sent from the server device 1 and the time period between the display of the quiz and the input of the answer is obtained in the client device 2. The server device 1 can certify a person whose answer time is the shortest among those who answered correctly as the winner based on information showing the time taken to answer sent from the client device 2.

Second, the above-described obtained time period certifying system can be applied in the case where a quiz or a test is conducted with a time limit. That is, the client device 2 obtains the time period between the display of the question and the input of the answer. The server device 1 certifies the answer as effective only when the obtained time period is judged to be within the time limit. If there are more than one questions in the quiz or test, the client device 2 may obtain the time period for finishing all the questions.

Third, the above-described obtained time period certifying system can be applied to decide the successful bidder in an auction when there are more than one bids at the same price for purchasing a product. That is, the client device 2 obtains the time period between the display of a newly presented price in the client device and the input of information for showing the intention to bid. The server device 1 can decide a person whose obtained time period sent from the client device 2 is the shortest to be the successful bidder. And the above-described obtained time period certifying system can be applied in the same way in the case where the number of a product is limited to X and the product is sold to the first X persons.

Fourth, the above-described obtained time period certifying system can be applied to a process whose operation time is set with a deadline. For example, in the case where a product which is dealt in an on-line shopping system is sold only when an intention to buy the product is shown within a predetermined time period, the client device 2 obtains the time period between the display of information on the product and the input of information showing the intention to buy the product. The server device allows the sales of the product only to the persons whose obtained time sent from the client device 2 is certified as within the predetermined time period.

Fifth, the above-described obtained time period certifying system can be applied to a process in which a specific operation can be canceled if it is within a predetermined time period. For example, it is such a process as that in an on-line securities transaction, a cancel can be accepted if an input to cancel the decision to buy or sell is performed within the predetermined time period. In this case, the client device 2 may retrieve the times kept by the inner timer when information to show the decision to trade and the cancel are input and obtain the time period by calculating the gap between the times.

Sixth, the above-described obtained time period certifying system can be applied to a case where the ability to move is judged by composing the inputting section 22 using a special inputting device 2D. For example, the client device 2 obtains the time period between the display of the instruction to perform a specific move and the end of the input by a user after following the instruction. The server device 1 certifies the time period sent from the client device 2 and can judge the ability to move based on the certified time period.

Seventh, the above-described obtained time period certifying system can be applied to a process in which it is required that a user of the client device 2 perform a predetermined operation within a predetermined time period. For example, it is such a process as that a user is granted a special favor (such as discount, presentation of a coupon and the like) on the condition that the user should click a banner advertisement on a homepage within a predetermined time period. In this case, the client device 2 obtains the time period between the display of the homepage which contains the banner advertisement and a click on the banner advertisement. The server device 1 may certify the time period sent from the client device 2 and grant the user the special favor if the time period is within the predetermined time period.

Eighth, the above-described obtained time period certifying system can be applied to a process in which a service is available to a user of the client device 2 only within a predetermined time period. For example, the client device 2 obtains the time period in which a user uses a program downloaded on line and after this, sends an e-mail to request a support free of charge. The server device 1 may certify the time period sent from the client device 2 and give the support free of charge if the time period is within the predetermined time period. Further, the above-described obtained time period certifying system can be applied to a process in which a program which utilizes information provided by the server device 1 is available only within a predetermined time period.

This application is based on Japanese Patent Application No. H11-273929 filed on Sep. 28, 1999 and including specification, claims, drawings and summary. The disclosure of the above Japanese Patent Application is incorporated herein by reference in its entirety.

What is claimed is:

1. A certifying system comprising a server device for sending information that requires a response and a client device configured to couple to said server device via a network for inputting a response to the information, wherein:

said client device comprises:
an information receiving means for receiving the information and a time period obtaining program sent from said server device through said network;
an outputting means for outputting the information received by said information receiving means;
a response inputting means for inputting a response to the information;
a time period obtaining means for obtaining a time period between the output of the information and the input of the response to the information by executing the time period obtaining program; and
a time data sending means for sending time data including the time period obtained by said time period obtaining means, to said server device through said network: and said server device comprises:
an information sending means for sending the time period obtaining program and the information to said information receiving means of said client device through said network;
a time data receiving means for receiving the time data and the time period obtaining program sent by said time data sending means of the client device through said network; and
an obtained time period certifying means for certifying the time period between the output of the information and the input of the response in said client device based on the received time period obtaining program and the time data received by said time data receiving means.

2. The certifying system according to claim 1, wherein:
said client device further comprises an encoding means for encoding the time data and transmitting the encoded time data to said time data sending means; and
said server device further comprises a decoding means for decoding the encoded time data received by said time data receiving means.

3. The certifying system according to claim 1, wherein said client device further comprises a scheduling means for adjusting the timing at which said time data sending means sends the time data to said server device.

4. The certifying system according to claim 1, further comprising an intermediate device disposed on said network between said server device and said client device, wherein said intermediate device comprises a means for receiving the time period obtaining program and the time data sent by said time data sending means of the client device, a means for sending the time period obtaining program and the time data received by said means for receiving the time data, to said server device through said network and, a scheduling means for adjusting the timing at which said means for sending the time period obtaining program and the time data sends the time period obtaining program and the time data to said server device.

5. A certifying system comprising a server device for sending information that requires a response and a client device configured to couple to the server device via a network for inputting a response to the information, wherein:

said client device:
comprises a memory for storing programs, a processor for executing the programs, a timer for keeping time, an inputting device for inputting information, an outputting device for outputting information and a first communication device for sending information to, and receiving information from, said server device;
outputs the information that requires a response at said outputting device;
receives a response to the output information from said inputting device;
obtains a time period between the output of the information and the input of the response by executing a time period obtaining program and using said timer; and
sends the time period obtaining program and time data including information related to the time period from said first communication device to said server device through said network, and said server device:
comprises a memory for storing programs, a processor for executing the programs and a second communication device for sending information to, and receiving information from, said terminal device;
receives the time period obtaining program and the time data sent by said client device from said second communication device; and
certifies the time period based on the received time period obtaining program and the time data received by said second communication device.

6. A certifying method for certifying a time period between presentation of information and input of a response to the information to a system, wherein the system comprises a server device for sending the information and a client device configured to couple to the server device for inputting the response to the information, said method comprising the steps of:

sending a time period obtaining program and the information to said client device through said network;
outputting the information at said client device;
receiving the response to the information from said client device;
obtaining the time period between the outputting step and the receiving step by executing the time period obtaining program;
sending the time period obtaining program used to obtain the time period and time data including the time period to said server device through said network; and
at the server device, certifying the time period based on the received time period obtaining program used to obtain the time period and the time data received at the sever device.

7. A certifying method for certifying a time period used for responding to information sent to a terminal device through a network, wherein the time period between an output of the information and an input of a response is obtained at said terminal device by executing a time period obtaining program, said method comprising the steps of:

receiving data including information related to the time period;
receiving the time period obtaining program used to obtain the time period from the terminal device; and
certifying the time period based on the received data and the received time period obtaining program.

8. A server device for communicating with a client device through a network, comprising:

a time data receiving means for receiving time data and a time period obtaining program from the client device through the network, wherein the time data including information related to a time period between an output of information that requires a response and an input of a response to the information in said client device, obtained by executing the time period obtaining program by the client device; and
an obtained time period certifying means for certifying the time period based on the received time period obtaining program and the time data received by said time data receiving means.

9. The server device according to claim 8, further comprising an information sending means for sending the information to said client device through said network.

10. The server device according to claim 9, wherein the time period obtaining program used for obtaining the time period is sent to said client device by the server device.

11. The server device according to claim 10, wherein said time period obtaining program is not reusable.

12. The server device according to claim 8, wherein:
the time data sent from said client device through said network are encoded; and
said server device further comprises a decoding means for decoding the encoded time data received by said time data receiving means.

13. The server device according to claim 12, further comprising a second program sending means for sending an encoding program to said client device to encode the time data.

14. The server device according to claim 8, further comprising a third program sending means for sending a scheduling program to said client device or an intermediate device between said server device and said client device, to adjust timing to send the time data through said network.

15. The server device according to claim 8, wherein:
said server device further comprises a program checking means for checking if the time data received by said time data receiving means are created by a proper time period obtaining program; and
said obtained time period certifying means further certifies the time period based on a check result of said program checking means.

16. A server device, configured to couple to a client device through a network, comprising a memory for storing programs, a processor for executing said programs and a communication device for sending information to, and receiving information from, said client device, wherein:
said communication device receives from the client device through the network time data about a time period between an output of information that requires a response and an input of a predetermined response in said client device, and a time period obtaining program that is used by the client device to obtain the time period; and the server device certifies the time period based on the received time period obtaining program and the time data received by said communication device.

17. A client device configured to couple to a server device through a network comprising:

an outputting means for outputting information that requires a response;

a response inputting means for inputting a response to the information output by said outputting means;

a time period obtaining means for obtaining a time period between an output of the information and an input of the response to said response inputting means by executing a time period obtaining program; and a time data sending means for sending the time period obtaining program and time data including the time period obtained by said time period obtaining means to said server device through said network;

wherein the time data and the time period obtaining program are used by the server device to certify the time period.

18. The client device according to claim 17, further comprising an information receiving means for receiving the information that requires a response from said server device through said network.

19. The client device according to claim 18, wherein said time period obtaining means comprises:

a means for retrieving a time reading kept by a timer when the information received from said server device is output to said outputting means;

a means for retrieving a time reading kept by the timer when the response is input to said response inputting means; and a means for calculating a period between the retrieved time readings.

20. The client device according to claim 17, further comprising an encoding means for encoding the time data including the time period obtained by said time period obtaining means, and transmitting the encoded time data to said time data sending means.

21. The client device according to claim 17, further comprising a scheduling means for adjusting timing at which said time data sending means sends the time data to said server device.

22. A client device, configured to couple to a server device through a network, comprising a memory for storing programs, a processor for executing said programs, a timer for keeping time, an inputting device for inputting information, an outputting device for outputting information and a communication device for sending information to and receiving information from said server device, wherein said client device:

outputs information that requires a response at said outputting device;

receives a predetermined input in response to the information from said inputting device;

obtains a time period between outputting the information and receiving the predetermined input by using said timer by executing a time period obtaining program; and sends the time period obtaining program and the obtained time period to said server device through said network from said first communication device;

wherein the time period obtaining program and the obtained time period are used by the server device to certify the obtained time period.

23. A computer-readable recording medium that stores a program, wherein said program , upon execution by a data processing system, controls the data processing system to perform:

an information sending function for sending information that requires a response to a terminal device through a network;

a time data receiving function for receiving, from the terminal device through the network, time data including a time period between an output of the information at the terminal device and an input of a response to the information at in said terminal device, and a time period obtaining program used by the terminal device to obtain the time period; and a certifying function for certifying the time period based on the time data and the time period obtaining program received by performing said time data receiving function.

24. A computer-readable recording medium that stores data and a program, wherein:

the data include information that requires a predetermined response and is to be output at a computer, said program, upon execution by a data processing system, controls the data processing system to perform:

a response inputting function for receiving a response to the information;

a time period obtaining function for obtaining a time period between the output of the information and the input of the response to the information by executing a time period obtaining program; and a time data sending function for sending the time period obtaining program and time data including information related to the time period to a computer device via a network;

wherein the time period obtaining program and the time data are used by the computer device to certify the time period.

25. The computer-readable recording medium according to claim 24, wherein said program further controls the data processing system to perform an encoding function for encoding the time data including the time period and giving them to said time data sending function, in said computer device.

26. The computer-readable recording medium according to claim 24, wherein said program further controls the data processing system to perform a scheduling function for adjusting the timing at which said time data sending function sends the time data.

27. A program data signal that is superimposed on a carrier wave and sent through a communication channel, wherein said program data signal controls a computer device that is connected to a plurality of terminal devices through a network to perform the steps of:

sending information that requires a response to the plurality of terminal devices that are connected to the computer device through said network;

receiving time data including a time period between an output of the information at respective terminal device and an input of a response at said respective terminal device, and a time period obtaining program used by the respective terminal device to obtain the time period, from said respective terminal device through said network; and for each respective terminal device, certifying the time period between the output of the information and the input of the response based on the received time period obtaining program and time data.

28. A signal including data and a program, and superimposed on a carrier wave, wherein:

said signal superimposed on the carrier wave is sent to a computer device via a network, the data include information that requires a predetermined response and is to be output at said computer device;

said program controls said computer device to perform the steps of: receiving a response to the information;

obtaining a time period between the output of the information and receipt of the response by executing a time period obtaining program; and sending the time period obtaining program and time data including the time period to a server device through said network;

wherein the time period obtaining program and the time data are used by the server device to certify the time period.

* * * * *